United States Patent [19]

Matsaki

[11] Patent Number: 5,008,809
[45] Date of Patent: Apr. 16, 1991

[54] DATA PROCESSOR CAPABLE OF OUTPUTTING CODES REPRESENTING DISPLAYED PATTERNS

[75] Inventor: Katsumi Matsaki, Sagamihara, Japan

[73] Assignee: Canon Kabushiki Kaisha, Tokyo, Japan

[21] Appl. No.: 4,849

[22] Filed: Jan. 12, 1987

Related U.S. Application Data

[63] Continuation of Ser. No. 719,030, Apr. 3, 1985, abandoned, which is a continuation of Ser. No. 351,457, Feb. 23, 1982, abandoned.

[30] Foreign Application Priority Data

Mar. 2, 1981 [JP] Japan .................................. 56-29542

[51] Int. Cl.5 .............................................. G06F 3/14
[52] U.S. Cl. ..................................... 364/200; 364/518; 340/709
[58] Field of Search ... 364/200 MS File, 900 MS File, 364/518–521; 340/709

[56] References Cited

U.S. PATENT DOCUMENTS 4,424,576  1/1984  Lange et al. ........................ 364/900
4,672,574  6/1987  Baird et al. ........................ 364/900

Primary Examiner—David L. Clark
Attorney, Agent, or Firm—Fitzpatrick, Cella, Harper & Scinto

[57] ABSTRACT

The character code data processor of the invention has a pattern memory for storing patterns, and a keyboard for inputting codes for reading out the patterns stored in the pattern memory. The input code can be displayed on a CRT in a recognizable form.

8 Claims, 2 Drawing Sheets

DATA PROCESSOR CAPABLE OF OUTPUTTING CODES REPRESENTING DISPLAYED PATTERNS

This application is a continuation of application Ser. No. 719,030, filed Apr. 3, 1985, which in turn was a continuation of application Ser. No. 351,457, filed Feb. 23, 1982, both now abandoned.

BACKGROUND OF THE INVENTION

1. Field of the Invention

The present invention relates to a data processor which is capable of outputting codes representing patterns displayed on a CRT (cathode-ray tube) of, for example, a visualizing means.

2. Description of the Prior Art

Character processing apparatuses are conventionally known which are capable of inputting characters and which are capable of editing sentences or the like. However, with character processing apparatuses of this type, a character displayed "*" on the CRT is represented by a binary number such as "0001", "0010", "0011" and "0100" or a hexadecimal number such as "1234" inside the apparatus. Such numbers are called codes.

One cannot readily confirm the codes for characters. For this reason, if the character processing apparatus does not have a means for storing the patterns of input data such as characters (special data), the operator cannot confirm the character codes of such input data.

SUMMARY OF THE INVENTION

It is an object of the present invention to provide a character code data processor which allows, at any time, confirmation of the code for any character of a character string.

It is another object of the present invention to provide a character code data processor which enables confirmation of the character code for a character of a character string displayed on a CRT, for example, the pattern of which cannot be displayed since it is not stored in the apparatus.

It is still another object of the present invention to provide a character code data processor which allows easy confirmation of character codes for special data (including characters, symbols, and patterns) which is not the standard data of the character processing apparatus.

The above and other objects of the present invention will become apparent from the following description which will be made with reference to the accompanying drawings.

DETAILED DESCRIPTION OF THE PREFERRED EMBODIMENTS

Figure 1:
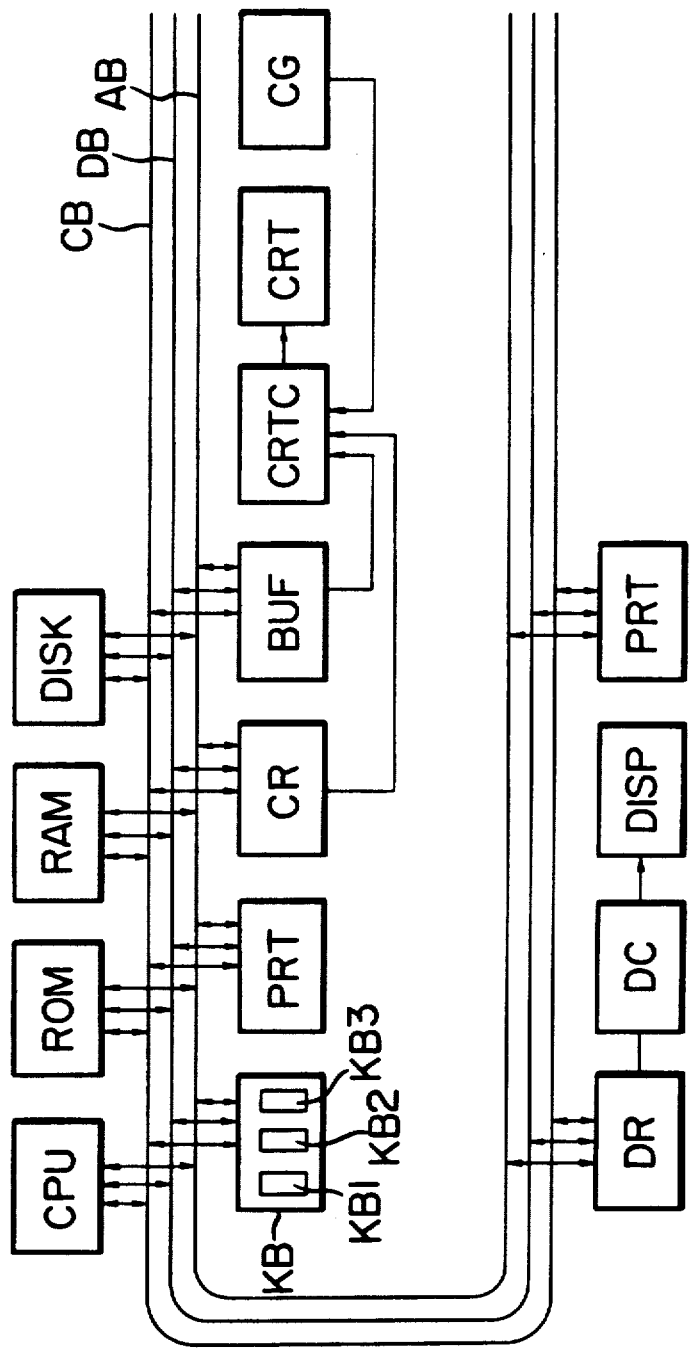
FIG. 1 is a block diagram of a character code data processor of the present invention.

FIG. 1 is a block diagram of a character code data processor according to an embodiment of the present invention. A CPU (central processing unit) comprises a microprocessor which performs various operations and logical judgments. The CPU also controls various pieces of equipment through an address bus AB for designating the equipment to be controlled, a control bus CB for applying control signals to various pieces of equipment to be controlled, and a data bus DB for transferring various pieces of data.

Figure 2:
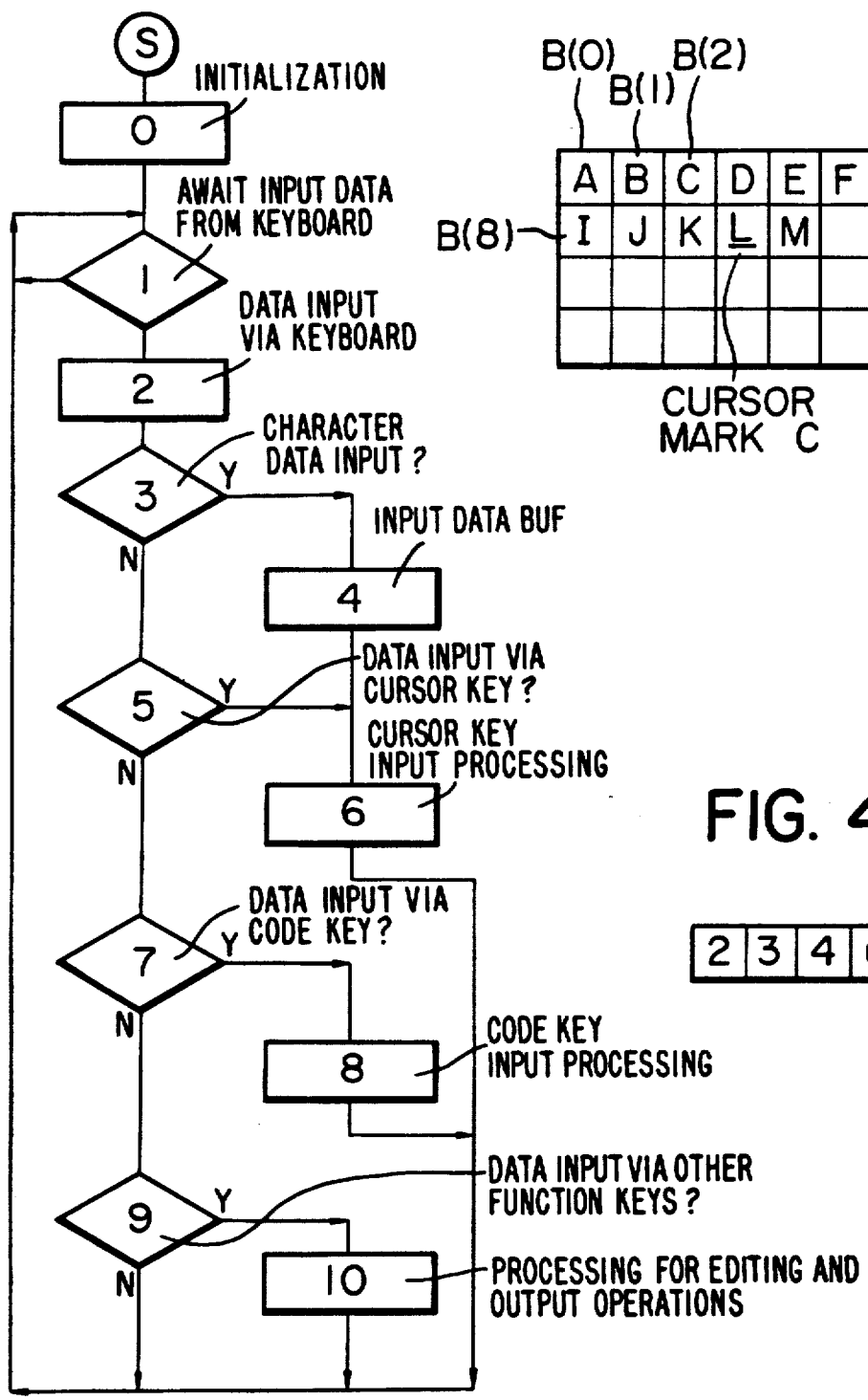
FIG. 2 is a flowchart showing the mode of operation of the apparatus according to the present invention.

A control memory, a ROM (read-only memory), stores a control program, the flowchart of which is shown in FIG. 2. A RAM (random access memory) serves to temporarily store various kinds of data.

A keyboard KB has a group of keys for inputting various instructions by the operator. The keyboard KB includes a character input key group KB1 for inputting characters, and function key groups KB2 and KB3 for inputting instructions for various functions. The character input key group KB1 may comprise a JIS keyboard or a tablet-type character input device and is for inputting character data. Data such as letters which are input through the character input keyboard KB1 are expressed by 16-bit binary numbers, for example, in the apparatus. The function key group KB2 has function input keys such as a cursor key and a code key. The function key group KB3 includes other editing keys such as an output instruction key.

A memory DISK for storing standard documents stores created documents. The documents stored in the memory DISK can be accessed as needed upon an instruction input through the keyboard.

A cursor register CR stores serial numbers, addresses 1 to 31 which can be read out under the control of the CPU. A CRT controller CRTC to be described later displays the cursor at a position on the CRT corresponding to the serial number stored in the cursor register CR. The CRT controller CRTC converts the serial number into a row number and a column number and displays the cursor at a position on the CRT corresponding to these numbers.

A buffer memory BUF has a capacity of 32 words and stores data input through the keyboard KB. The contents in the buffer memory BUF are expressed by B(N) in the description to follow of the mode of operation of the apparatus. Thus, B(N) represents the contents stored at an address N of the buffer memory BUF (where N is 0 to 31).

As described above, the CRT controller CRTC serves to display on the CRT the contents stored in the cursor register CR and the buffer memory BUF. The contents of the buffer memory BUF are displayed on a display area of the CRT having 8 columns and 4 rows. Correspondence of the data arrangement in the buffer memory BUF with the CRT screen is represented by B(0), B(1), B(2), and so on in FIG. 3. A cursor mark CM is displayed at a position on the CRT corresponding to the column number and row number obtained from the serial number stored in the cursor register CR. The contents in the BUF are displayed by patterns generated by a character generator CG to be described later.

The CRT thus has a display area of 4 columns and 8 rows on which the characters and the cursor are displayed by the CRT controller CRTC.

As described above, the character generator CG generates the patterns for displaying the characters on the CRT or for printing the characters by a printer PRT. The printer PRT prints the data stored in the buffer memory BUF.

A display register DR has a capacity of 16 bits and is capable of writing data under the control of the CPU. The data stored in the display register DR is converted into hexadecimal data and is displayed at a display device DISP to be described later.

A binary-to-hexadecimal converter DC converts the binary data into hexadecimal data. The binary-to-hexadecimal converter DC receives 16-bit data and converts it into a hexadecimal code.

For example, when binary data "0001", "0010", "0011", and "0100" are input, they are converted into 4-digit code data "1234".

Figure 4:
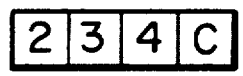
FIG. 4 is a view showing a code display obtained with the apparatus according to the present invention.

The display device DISP receives the hexadecimal code output by the binary-to-hexadecimal converter DC and displays the code, as shown in FIG. 4. In the case of the example described above, "1234" is displayed.

The mode of operation of the apparatus of the configuration as described above will now be described with reference to FIGS. 3 and 4. When the operator turns on the power, the operation starts according to the flowchart as shown in FIG. 2. The processing steps will now be described. The contents of the respective steps shown in FIG. 2 are as follows:

0. Initialization.
1. Waits for input data from the keyboard KB.
2. Data is input through the keyboard KB.
3. It is discriminated if the input data is character data. If the discrimination result is YES, the flow advances to step 4. If the discrimination result is NO, the flow advances to step 5.
4. Character input processing is performed; the input data is written in the buffer memory BUF. Thus, the operation B(N$\leftarrows$ input data (where N is the serial number stored in the cursor register CR) is performed.
5. It is discriminated if the input data is the data input through the cursor key. If the discrimination result is YES, the flow advances to step 6. If the discrimination result is NO, the flow advances to step 7.
6. Cursor key input processing is performed; the cursor is advanced by one position and the flow returns to step 1.
7. It is discriminated if the input data is data input through the code key. If the discrimination result is YES, the flow advances to step 8. If the discrimination result is NO, the flow advances to step 9.
8. Code key input processing is performed; the flow returns to step 1.
9. It is discriminated if the input data is data input through other function keys. If the discrimination result is YES, the flow advances to step 10. If the discrimination result is NO, the flow returns to step 1.
10. Processing for various editing and output operations is performed.

Each step will now be described in more detail. In step 0, all the buffers, registers and so on are initialized. Thus, the operations below are performed:

---
$CR \leftarrows 0$
$B(N) \leftarrows$ space code (where N = 0, 1, 2, to 31)
$DR \leftarrows 0$
--- to display the cursor at the upper left position on the CRT screen and to clear all the characters which may be displayed on the screen. The display device DISP displays a four-digit number "0000". In step 1, the apparatus is ready for receiving data input through the keyboard KB.

In step 2, the data input through the keyboard KB is loaded. In step 3, it is discriminated if the input data is character data. If the input data is data input through the character key group KB1, the flow advances to step 4. If the discrimination result is NO, the flow advances to step 5.

In step 4, the data input through the keyboard KB is written in the buffer memory BUF. Thus, the operation below is performed:

$B(N) \leftarrows$ input data (where N is the serial number stored in the character register CR). Upon this operation, the input data is displayed at the position on the CRT screen where the cursor is located. The flow then advances to step 6 wherein the address of the cursor is incremented by one.

In step 5, it is discriminated if the input data is the data input through the cursor key. If the discrimination result is YES, the flow advances to step 6. If the discrimination result is NO, the flow advances to step 7.

In step 6, the address of the cursor is incremented by one. Thus, if the content in the cursor register is equal to or larger than 31, the operation CR=0 is performed. If the content of the cursor register CR is smaller than 31, the operation $CR \leftarrows CR + 1$ is performed. In step 7, it is discriminated if the input data is data input through the code key. If the input data is the data input through the code key, the flow advances to step 8. If the discrimination result is NO, the flow advances to step 9.

In step 8, the code for the character above the cursor is displayed by the display DISP.

Thus, the operation below is performed:

$DR \leftarrows B(N)$ (where N is the serial number stored in the cursor register CR).

In step 9, it is discriminated if the input data is the data input through other function keys. If the input data is the data input through other function keys, the flow advances to step 10. If the discrimination result is NO, the flow returns to step 1.

In step 10, processing of various editing and output operations is performed. The description of this step will not be made, since it is not directly related to the present invention.

Figure 3:
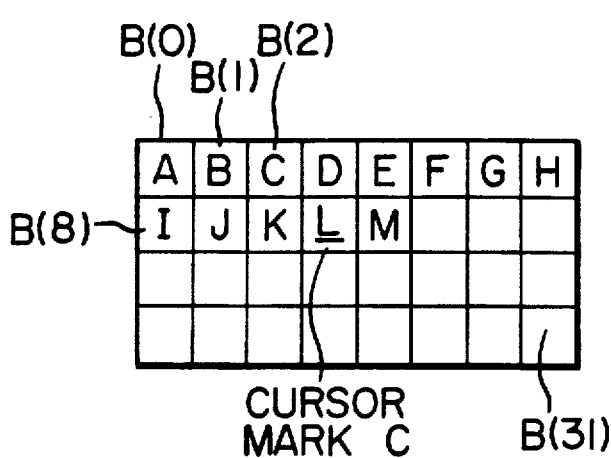
FIG. 3 is a view showing a display obtained with the apparatus according to the present invention.

Assume that the display as shown in FIG. 3 is displayed on the CRT. If the operator desires to confirm the code of a pattern L above the cursor mark C, the operator depresses the code key of the function key group KB2.

Starting from step 1, the flow progresses through steps 5, 7 and 8. In step 8, the 16-bit code of the pattern L stored in the buffer memory BUF is transferred to the display register DR on the basis of the content stored in the cursor register CR. The 16-bit code is converted into hexadecimal data by the binary-to-hexadecimal converter DC and is displayed on the display device DISP as shown in FIG. 4. In this manner, the operator can confirm the code of the pattern displayed on the CRT. If this operation is performed when nothing is displayed at the position of the CRT above the cursor mark C and data is assumed to be present at this position, the code which is converted from binary into hexadecimal notation can be displayed. This can be converted into a number in a notation having a base still greater than sixteen or to a form which is easy to understand for the operator Therefore, the code may be expressed in another form 1. Although the above embodiment is described with reference to the case of a character code output apparatus with a CRT, the present invention may be similarly applied to other types of character processing apparatuses. For example, the present invention can be applied to a character code output apparatus which does not have a CRT but which has a printer, only if it has a means for designating the character, the code of which is to be confirmed, and a means for displaying or printing the code, The present invention may also be applied to a character processing apparatus which does not have a character input function such as a character recognition apparatus or a voice input apparatus.

2. In the above embodiment, keys are used as the means for designating the character code. However, other means may be used for this purpose.

3. In the above embodiment, both the CRT and the display device DISP are used. However, one display device may serve for both purposes.

According to the present invention, it is possible to confirm with ease and at any time the code for a character in character data.

In the embodiment described above, the binary code is converted into a hexadecimal code. However, the binary code may be directly output without modification or may be converted into a number of still greater notation.

What I claim is:

1. An information processing apparatus comprising:
    keyboard means for entering character information, said keyboard means having manual instruction means for recalling character information;
    memory means for storing character information entered from said keyboard means, said memory means storing character information in the form of encoded signal information;
    converting means connected to said memory means for converting character information stored in said memory means to corresponding character pattern information;
    display means connected to said converting means for displaying the character pattern information converted from corresponding character information by said converting means; and
    control means connected to said keyboard means for recalling encoded signal information corresponding to character pattern information being displayed by said display means and for displaying said character information in the form of encoded signal information on said display means when instructed by said manual instruction means, said control means recalling said character information in the form of corresponding encoded signal information stored in said memory means after said character pattern information is displayed by said display means, said control means comprising cursor control means for specifying particular character pattern information being displayed by said display means for which the corresponding encoded signal information is to be displayed, said cursor control means specifying said particular character pattern with a cursor.

2. An information processing apparatus according to claim 1, further comprising visualizing control means including a display element for visually displaying the encoded signal information recalled by said control means in hexadecimal notation.

3. An information processing apparatus according to claim 5 further comprising visualizing control means including read out means connected to said memory means for reading out the encoded signal information recalled by said control means from said memory means.

4. An information processing apparatus according to claim 1, wherein said converting means comprises a pattern memory storing pattern information corresponding to the character information.

5. An information processing apparatus comprising:
    input means having a plurality of character keys for entering information;
    memory means connected to said input means for storing code information representative of character information entered from said input means;
    converting means connected to said memory means for converting said code information stored in said memory means to corresponding character pattern information;
    display means connected to said converting means for displaying said character pattern information converted from corresponding code information by said converting means; and
    manual instruction means operable with said memory means for providing instructions to selectively recall from said memory means said code information representative of said character pattern information and to display said code information on said display means, said manual instruction means comprising specifying means for specifying particular character information being displayed by said display means for which the corresponding code information is to be displayed, said specifying means being cursor moving instructions means for specifying the particular character information with a cursor and for instructing the moving of the cursor.

6. An information processing apparatus comprising:
    input means for manually entering character information;
    memory means connected to said input means for storing code information representative of character information entered from said input means;
    converting means connected to said memory means for converting said code information stored in said memory means to corresponding character pattern information;
    display means connected to said converting means for displaying said character pattern information converted from corresponding code information by said converting means;
    specifying means operable with said display means for specifying one of said character pattern information being displayed by said display means, said specifying means being cursor control means for specifying one of said character pattern information with a cursor; and
    recalling means for recalling from said memory means code information corresponding to said character pattern information specified by said specifying means and for displaying said code information on said display means.

7. An information processing apparatus according to claim 6, wherein said input means further comprises instruction means for providing instructions for moving said cursor.

8. An information processing apparatus comprising:
    input means for manually entering character information;
    memory means connected to said input means for storing code information representative of character information entered from said input means;

converting mean connected to said memory means for converting said code information stored in said memory means to corresponding character pattern information;

display means for displaying said character pattern information converted from corresponding code information by said converting means, and for displaying a cursor which designates displayed character pattern information;

specifying means for controlling said cursor to specify a particular character pattern information being displayed by said display means; and recall means for recalling code information corresponding to the particular character pattern information specified by said cursor and for displaying the recalled code information on said display means.

* * * * *

UNITED STATES PATENT AND TRADEMARK OFFICE
CERTIFICATE OF CORRECTION

PATENT NO. : 5,008,809

DATED : April 16, 1991

INVENTOR(S) : Katsumi Masaki

It is certified that error appears in the above-identified patent and that said Letters Patent is hereby corrected as shown below:

COVER PAGE:

[19] "Matsaki" should read --Masaki--;
    [75] "Katsumi Matsaki, Sagamihara, Japan" should read
      --Katsumi Masaki, Sagamihara, Japan--.

COLUMN 2:

Line 58, "4 columns and 8" should read --8 columns and 4--.

COLUMN 3:

Line 30, "B(N $\doteq$ input" should read --B(N) $\doteq$ input--.

COLUMN 4

Line 62, "operator" should read --operator.--.

UNITED STATES PATENT AND TRADEMARK OFFICE
CERTIFICATE OF CORRECTION

PATENT NO. : 5,008,809
DATED : April 16, 1991
INVENTOR(S) : Katsumi Masaki

It is certified that error appears in the above-identified patent and that said Letters Patent is hereby corrected as shown below:

COLUMN 5:

> Line 2, "a printer," should read --visualizing means such as a printer,--;
> Line 5, "code," should read --code.--; and
> Line 66, "claim 5," should read --claim 1,--.

COLUMN 7:

> Line 1, "mean" should read --means--.

Signed and Sealed this

Fourth Day of February, 1992

Attest:

HARRY F. MANBECK, JR.

*Attesting Officer*  *Commissioner of Patents and Trademarks*